Feb. 13, 1973   L. L. GUZICK   3,715,870
ORIFICE AND FILTER ASSEMBLY
Filed June 29, 1970
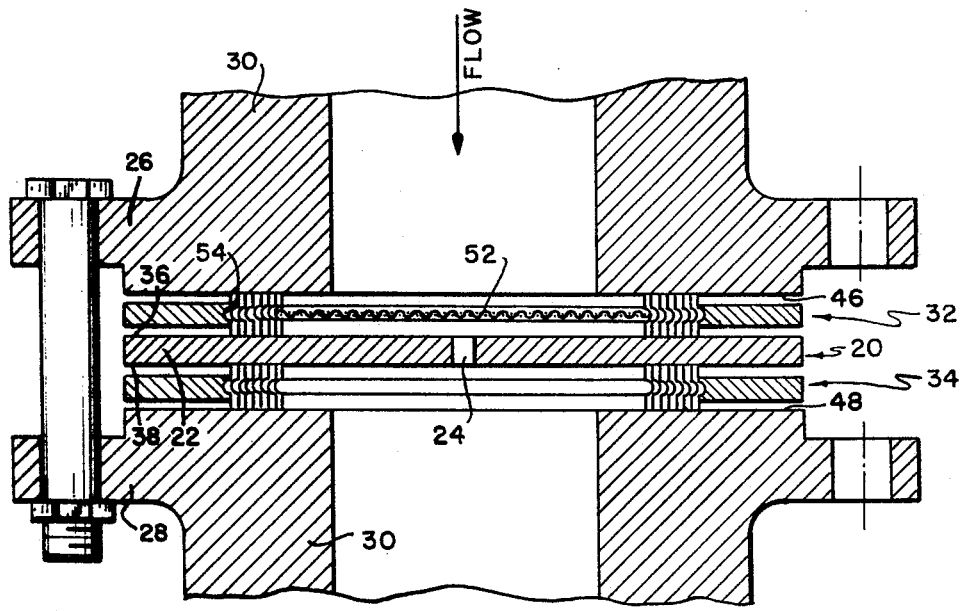
FIG. 1.
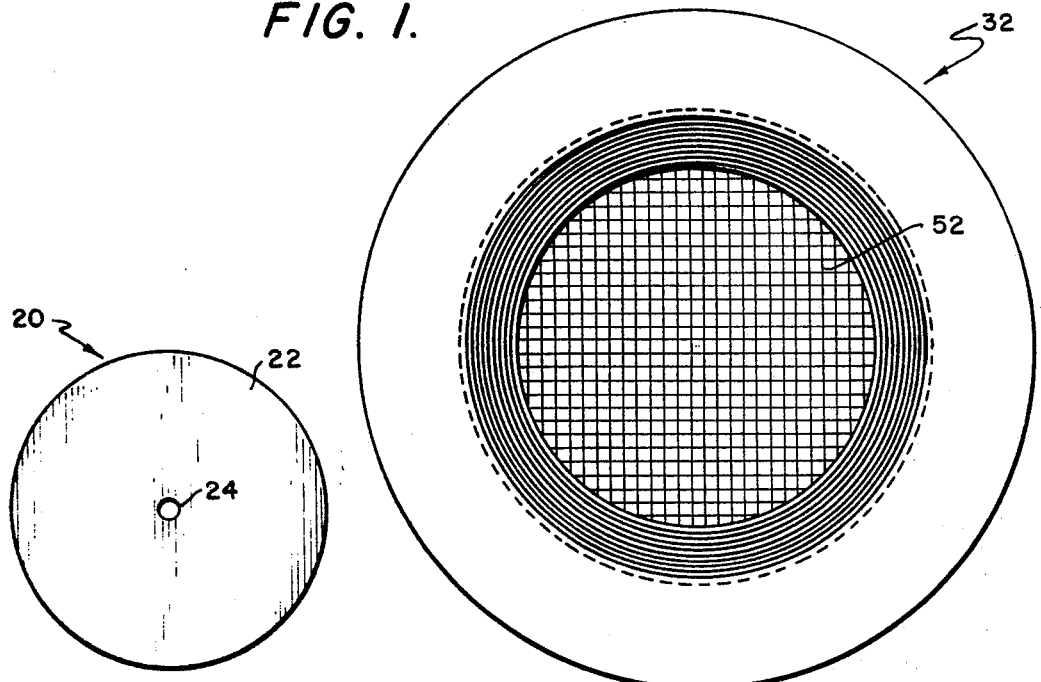
FIG. 2A.
FIG. 2B.
FIG. 3.
INVENTOR.
LAWRENCE L. GUZICK
BY 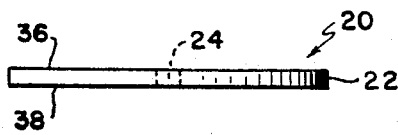
ATTORNEYS

United States Patent Office 3,715,870
Patented Feb. 13, 1973

3,715,870
ORIFICE AND FILTER ASSEMBLY
Lawrence L. Guzick, 10322 Royal Road,
Silver Spring, Md. 20903
Filed June 29, 1970, Ser. No. 50,501
Int. Cl. B01d 35/02
U.S. Cl. 55—466                         2 Claims

ABSTRACT OF THE DISCLOSURE

A plate member containing an orifice for use in a pipeline of steam powered equipment to control the drainage of steam condensate with a minimum loss of steam. A filtering element is located adjacent the plate member in the pipeline to prevent deleterious material from clogging the orifice.

---

The invention described herein may be manufactured and used by or for the Government of the United States of America for governmental purposes without the payment of any royalties thereon or therefor.

BACKGROUND OF THE INVENTION

The present invention relates broadly to fluid handling devices and more particularly to improvements in fluid separating traps as included in the pipelines of shipboard, steam powered equipment.

Conventional steam traps generally comprise valving components designed to open in the presence of condensate and to close in the presence of steam. The principal feature of the conventional trap was to minimize the loss of steam in a system while at the same time maintaining the pipelines clear of condensate and thereby permit free circulation of steam throughout the system.

Under actual working conditions, conventional steam trap devices require substantial maintenance to adequately effect the intended operating characteristics. In many instances malfunctioning steam traps must be extensively repaired or replaced thereby necessitating a partial or complete shutdown of the steam powered equipment.

Other well known condensate trap devices employ reservoirs having specially designed conduit outlets open to the atmosphere. In the operation of these types of devices a predetermined quantity of condensate is allowed to collect in a reservoir within the trap. As the operating pressure in the lines of the steam equipment increases, a proportionate amount of the collected condensate is discharged from the trap. However, due to the varying pressure conditions within the steam system, largely based on the power demands in any given time period, the conduit outlets are not capable of discharging the condensate at a constant rate. Consequently the condensate, illustratively water in this instance, may be drawn back into the steam system from the trap, or is never removed from the system into the trap. This malfunction of the trap forces the retention of harmful moisture in the steam pipelines and results in the attendant disadvantages of a reduction in the efficiency of the steam powered equipment and damage to its working parts.

SUMMARY OF THE INVENTION

The general purpose of this invention is to provide an automatically discharging condensate device that has all of the advantages of similarly employed prior art devices and has none of the above described disadvantages. To attain this, the present invention provides an orifice plate means in the gas train of a steam line from which it is desired to separate condensate. The invention also provides an in-line strainer, formed integrally with a gasket material, and included to separate dirt, grease, and the like from the condensate to thereby avoid restricting or otherwise blocking the passage of the condensate through the orifice plate means.

OBJECTS OF THE INVENTION

An object of the present invention is to provide a condensate discharge device which will be automatic in its operation, strong and durable, and not liable to become inoperative at any time during its use.

Another object of the present invention is to provide a condensate discharge device which is continuous in operation and requires no special attention after proper adjustment to operating conditions.

A still further object of the invention is the provision of a condensate drain which will continuously remove moisture from a system without becoming over-pressurized due to being clogged or otherwise fouled in operation.

Another object of the present invention is the provision in a condensate drain of means for separating out dirt, grease and the like from a steam operating system.

Still another object of the invention is to provide a condensate discharge device which is inexpensive to manufacture, simple in installation, and operation, extremely durable, and requires a minimum of maintenance.

Other objects and advantages of the present invention will become apparent from the following description of a preferred embodiment thereof, the claims, and the drawings in which:

BRIEF DESCRIPTION OF THE DRAWINGS

FIG. 1 is an elevation, in section, showing the orifice plate and the line strainer positioned in accordance with the invention.

FIGS. 2A and 2B are detail illustrations of the orifice plate of the invention.

FIG. 3 is a detailed illustration of the line strainer of the invention.

DESCRIPTION OF THE PREFERRED EMBODIMENT

Referring in detail to the drawings, FIG. 1 illustrates a condensate discharge device embodying the invention and is hereinafter to be described with reference to exemplary use with steam powered equipment designed for shipboard operation.

It is the usual practice when designing steam lines to include condensate traps to remove liquid, usually water, accumulating in the lines. Conventional steam traps open and close automatically depending on the presence of either water or steam at the trap location, and hence are subject to mechanical failure resulting in the likelihood of over-pressurization of the steam system in the manner as hereinbefore suggested.

In FIG. 1, there is shown an exemplary automatic condensate discharge device 20 which comprises a plate 22 having an orifice 24 of a predetermined diameter centrally located in the plate.

In practice, the diameter of the orifice 24 is determined by the operating pressure within the particular steam system, since the purpose of the invention is to minimize the loss of steam while at the same time effecting optimum condensate discharge. For example, at lower pressure, the orifice 24 can be of a larger diameter whereas at higher steam pressures, the diameter would be reduced accordingly. However, once the diameter of the orifice has been established for the particular working steam pressure in a system, no further changes in the orifice plate 20 need be made and the system will operate thereafter with a minimum of maintenance. Of course, if maintenance is required, or if the pressure of the steam system is changed to thereby require a different sized discharge orifice, the unique construction of the discharge device of the invention facilitates the removal and replacement of the plate 20 in a manner to be hereinafter described.

To provide easy removal of the plate 22 from a steam line or to permit substitution of a plate having a differently sized orifice, the plate 22 is located between flanges 26 and 28 of a steam line 30. Gaskets 32 and 34 are shown in FIG. 1 to be disposed on opposite faces 36 and 38 of plate 22 and against shoulders 46, 47 of the flanges thereby providing an appropriate seal and preventing excessive loss of steam at the jointure illustrated.

While it is understood that any suitable gasket material may be used to accomplish the sealing effect without departing from the spirit of the invention, the spiral wound gasket assembly as shown in FIGS. 1 and 3 is preferred. The illustrated gasket assembly is commercially marketed by the Flexitallic Gasket Co. of Camden, N.J., and Philadelphia, Pa., under the trademark "Flexitallic."

It should also be understood that the plate 22 may be made from any material suitable for use in a high pressure steam environment. While relatively thick steel is contemplated as the preferred material for the plate 22, it should be recognized that other metals, plastics, or specially developed glass substances having a resistance to the cutting action of the condensate and steam may be employed without departing from the spirit of the invention or without otherwise affecting the operation of the discharge device as herein proposed.

FIGS. 1 and 3 show a strainer screen 52 located within an annular groove 54 of the spiral wound gasket 32. The strainer 52 is located on the pressure side of the plate 22 and comprises a mesh material, preferably of stainless steel, of such size to permit moisture and fine dirt to pass through the opening 24 in the plate 22 but will screen out the larger particles of dirt or scale which would clog up the opening in the plate 22.

From the foregoing description it has been shown that this invention provides an improved, maintenance free condensate discharge device that is automatic in operation and which satisfies the previously stated objects and advantages as well as others apparent from this description.

Of course it will be recognized that while the invention has been described with reference to a steam system, it is obvious that the condensate discharge device could be disposed in compressed air systems or in any system wherein the condensate in gas streams must be automatically removed from the system. Moreover, many other modifications, variations and uses of the present invention are possible in the light of the above teachings. It is understood therefore that the invention may be practiced otherwise than as specifically described.

What is claimed is:

1. A condensate discharge device comprising:
   a first annular gasket means having an annular groove;
   a metal mesh strainer sheet mounted in said groove of said first gasket means to permit moisture and fine dirt to pass through said strainer sheet but not larger particles of dirt or scale;
   a metal discharge plate in contact with said first gasket means having an orifice centrally located within said plate to provide an opening for fluid flow;
   a second annular gasket means mounted in contact with said discharge plate; and
   housing means having inlet and outlet flow openings to hold said first annular gasket means, strainer sheet, discharge plate and second annular gasket means together as an assembly and to permit flow therethrough.

2. A condensate discharge device as in claim 8 wherein said housing means comprises:
   first and second pipes having flanged ends, said first annular gasket means in contact with the flanged end of said first pipe and said second annular gasket means in contact with the flanged end of said second pipe; and
   securing means connecting the flanged ends of said first and second pipes.

References Cited

UNITED STATES PATENTS

| | | | |
|---|---|---|---|
| 2,068,858 | 1/1937 | Jones | 210—448 |
| 1,152,708 | 9/1915 | Coleman | 138—40 |
| 2,059,017 | 10/1936 | Nickle | 55—485 |
| 2,127,397 | 8/1938 | Freedlander | 55—503 |
| 2,288,715 | 7/1942 | Karrer et al. | 138—44 |
| 2,520,089 | 8/1950 | Lippincott | 138—40 |
| 2,705,543 | 4/1955 | Torres | 55—466 |
| 2,803,347 | 8/1957 | Whitlock, Jr. | 138—41 |
| 3,415,041 | 12/1968 | Kraissl, Jr. | 55—342 |

BERNARD NOZICK, Primary Examiner

U.S. Cl. X.R.

55—502, 511; 138—44; 210—445, 446